(Model.)
H. OBERMEYER.
MOUSE TRAP.
No. 532,986. Patented Jan. 22, 1895.
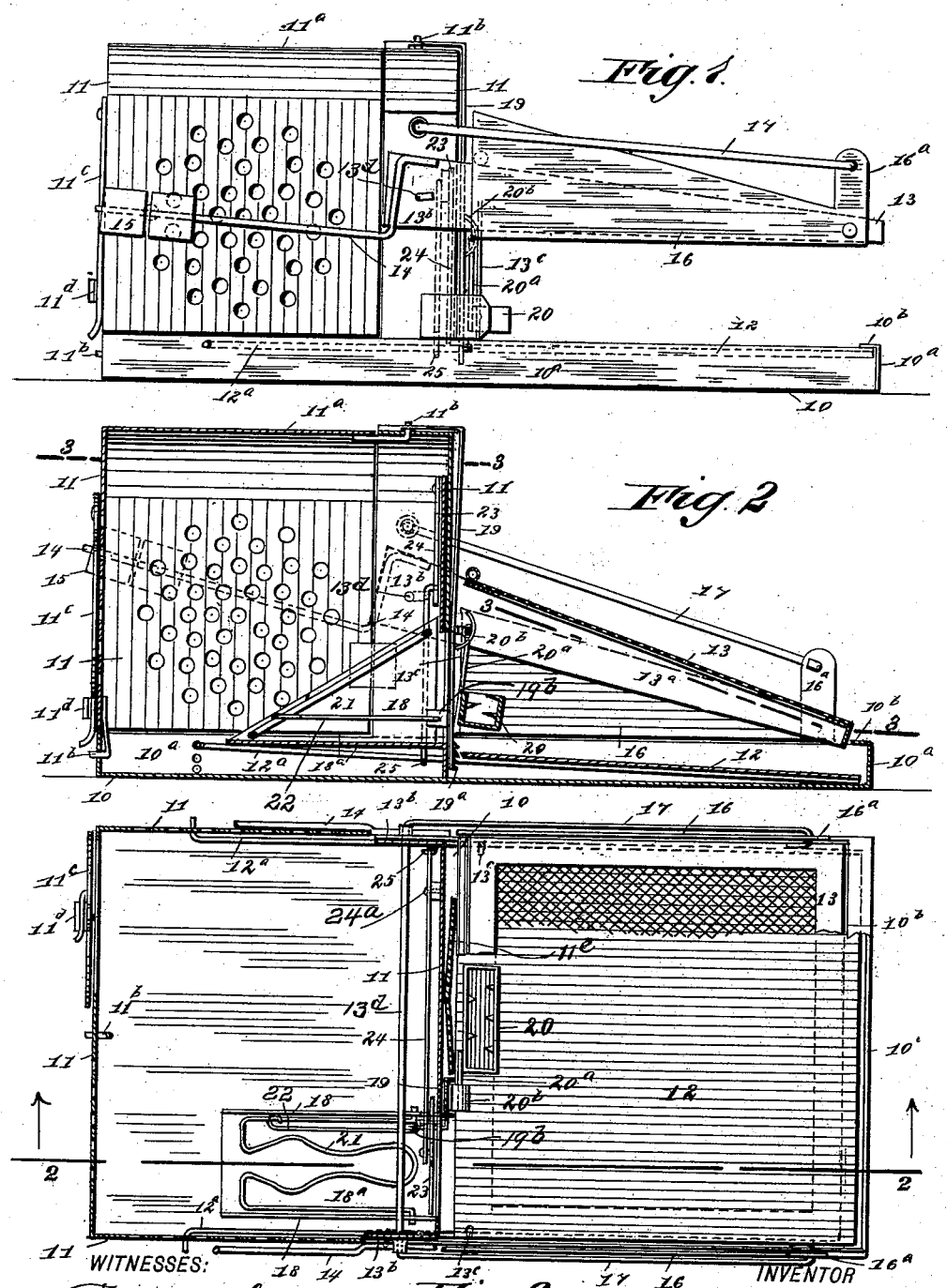
WITNESSES:
F. McArdle.
Wm. P. Patton.
INVENTOR
H. Obermeyer
BY
Munn & Co
ATTORNEYS

UNITED STATES PATENT OFFICE.

HENRY OBERMEYER, OF JANSEN, NEBRASKA.

MOUSE-TRAP.

SPECIFICATION forming part of Letters Patent No. 532,986, dated January 22, 1895.

Application filed August 16, 1894. Serial No. 520,512. (Model.)

*To all whom it may concern:*

Be it known that I, HENRY OBERMEYER, of Jansen, in the county of Jefferson and State of Nebraska, have invented a new and useful Improved Mouse-Trap, of which the following is a full, clear, and exact description.

My invention relates to an improved trap for the capture of rodents, and particularly for catching mice, and has for its object, to provide a novel device of the character indicated, which will be portable, easy to construct and that will be certain in operation, capturing the animal alive that enters the trap.

To this end, my invention consists in the construction and combination of parts, as is hereinafter described and indicated in the claims.

Reference is to be had to the accompanying drawings forming a part of this specification, in which similar figures of reference indicate corresponding parts in all the views shown.

Figure 1 is a side view, showing working parts of the trap adjusted for the reception of the rodent. Fig. 2 is a partly sectional side view of the improvement, on the line 2—2 in Fig. 3; and Fig. 3 is a partly sectional plan view of the trap, on the line 3—3 in Fig. 2.

The improved trap belongs to a class in which a retaining cage is provided, into which the animal passes from the trap portion.

In the drawings, 10 represents the bottom piece that affords a base wall for the entire device, and is so proportioned in area as to afford room on it for the reception and support of two nearly square compartments of suitable dimensions for effective service. A border flange $10^a$ is turned up around the edge of the bottom wall 10, having a suitable height, the use of which will be explained.

The cage portion of the device consists of a four-walled structure at the sides, which walls 11, are surmounted by a top wall or cover piece $11^a$, and as indicated, the two side walls and rear wall of the cage are numerously perforated to admit light and air.

It is preferred for the purpose of convenience in cleaning the cage portion of the trap, to construct it in two parts that are readily connected by spring latching hooks $11^b$, as shown in Fig. 2. One of these interlocking hooks which depends from the rear wall of the cage, engages a perforation in the border flange $10^a$ of the bottom wall 10, thereby securing the cage wall and bottom together.

At the rear, an aperture of sufficient diameter is produced in the cage wall, as represented in Fig. 3, this hole being provided to enable the removal of a live or dead rodent that has been secured in the cage, the aperture being covered by the pivoted gate or door $11^c$, that when in closed adjustment passes below the keeper clip $11^d$, which projects from the rear wall of the cage and is laterally bent to adapt it to bear on the gate at its lower edge, and thus bind said gate on the cage wall so that it can only be moved by such a vibration on its pivot as will remove it from the part $11^d$. There is a platform 12 furnished as a portion of the trap proper, which platform is preferably produced from sheet metal, rectangular in contour, flat on top and bottom sides, and of such dimensions as will allow it to loosely fit in the space encompassed by the border wall $10^a$, forwardly of the front wall 11 of the cage that has been described.

The cover piece or hood of the trap comprises a rectangular frame 13, covered with woven wire fabric, as shown, or it may be formed of sheet metal in a single piece that is numerously perforated to admit light and air, said piece 13, having a depending border flange $13^a$ produced on its margin. The area of the hood 13 is so proportioned, that it will be slightly smaller than that of the bottom wall portion 10, over which it is suspended. Two ears $13^b$ are rearwardly and oppositely extended from the sides of the hood 13 at its rear edge, which ears are oppositely pivoted to the forward portions of the side walls of the cage. Preferably a single wire rod $13^d$ is employed to serve as a pivot bolt for both ears, its ends being projected through aligned perforations in the cage walls and the ears, and bent at a right angle outside of the latter, to prevent accidental displacement.

On the ears $13^b$, two similar arms 14 are affixed by their front ends, and extend rearwardly in parallel planes, having weights 15 on their rear ends to overbalance the hood 13, and elevate it to a nearly horizontal position, the degree of upward movement of the front of the hood being regulated by the impingement of the rear edge of said part 13 on the front of the cage, which will locate the lower edges of the hood about in parallel with the bottom of the hood about in parallel with the bottom wall 10 when elevated, the top wall of said hood being then slightly inclined downwardly.
Two similar wing walls 16 are furnished for the hood, which parts are sloped on the top edge, to conform with the degree of inclination afforded to the top of the hood, while their lower edges are in parallel with the bottom piece 10 and lie about flush with the lower edges on the sides of the hood when the latter is elevated and the wings thereto connected, these wings serving to increase the capacity of the hood when all are depressed.

A short arm 16ª is formed on or secured to each wing piece, near its front end, so as to project vertically, or at right angles with the lower edge of the same, and near their front ends the wings 16 are pivoted to the sides of the hood oppositely and near the front edge of the latter. The arms 16ª are pivoted at their upper ends to the forward ends of the similar link rods 17, that have their rear ends loosely secured to the sides of the cage above the arms 14, and near the front wall 11, as is indicated in Figs. 1 and 2.

The platform 12 is furnished with two arms 12ª, that are of an equal length, and extend from the sides of the platform into the cage, through apertures in its front wall, said arms having a sufficient length to permit their rear ends to have a pivotal connection of the same produced with the upright flanges 10ª near the rear end of the bottom wall 10, as clearly shown in Fig. 3, a number of perforations being provided to permit a proper adjustment of the arms.

Near the front wall of the trap cage, two hanger rods 13ᶜ are loosely secured by their ends to the sides of the hood near its pivoted ears, and also to the sides of the platform 12, near its rear edge, the length of these two rods being equal, and so proportioned that the platform will be lifted by them into a position that will dispose it in a level plane, the upward movement of said platform at the front, being checked at a proper point by its impingement on the rearwardly projected overhanging lip 10ᵇ, that is formed on the upper portion of the front flange 10ª, as shown by dotted lines in Fig. 1.

The front wall of the cage portion is apertured near one side of the cage of sufficient size to allow mice to pass through, and is nearly rectangular in outline, said aperture being designed to afford a passage from off the platform 12, into the cage when the hole mentioned is unobstructed. Two parallel guard walls 18 are integrally formed on a bottom plate 18ª, and these parts are secured by one end along the side and bottom edges of the aperture in the front wall 11 of the cage, thereby affording a guarded passageway for rodents that may pass through the aperture.

There is a spring detent 19 in plate form, secured by its upper end on the top wall of the case portion of the trap, and is bent at a right angle so as to permit its main portion to depend in front of the case, as shown in Figs. 1 and 2. The lower end portion of the detent 19 extending between the rear edge of the platform 12, and front wall 11 of the trap case has fine serrations formed on the front side, as shown at 19ª in Fig. 2. These teeth that are in ratchet form slope upwardly and inwardly, which adapts either of the series of said teeth to interlock with the platform's rear edge when the latter is depressed, and the spring is permitted by its resilience to press toward the platform.

A bait box 20 is loosely hung by its upright limb 20ª, from a bracket that forwardly projects from the front wall of the trap case, and on the upper part of said limb a curved presser piece 20ᵇ is secured, the top and lower edges of which lie near to the depending detent spring 19, and in front of the same, as shown in Fig. 2.

Owing to the position and arrangement of parts just described, if bait secured in the box by an interlooking engagement with tangs that are projected from the inner walls of said box, is pulled upon or pressed against, so as to vibrate the bait box, the detent spring 19, will be correspondingly actuated, and so moved to the rear that the serrations on its forward edge at the lower end will be released from contact with the rear edge of the platform 12, and the latter be permitted to rise into the position shown by dotted lines in Fig. 1, providing said platform is not subjected to pressure.

An angular mirror 11ᶜ, shown in Fig. 3, is placed on the front wall 11 above the bait box, which will reflect the animal, and when seen by the mouse make it believe other mice are feeding at the bait, and give it confidence to pull at the bait as stated.

In the passageway provided by the parallel walls 18 and bottom wall 18ª, a skeleton gate 21, made of wire, is located, this part being pivoted to the walls 18 at its upper end, and lying inclined rearwardly and downwardly. From one side edge of the gate 21, a connecting rod 22 is forwardly extended, so that its front end may be loosely jointed to an ear 19ᵇ on the rear side of the detent spring 19, as clearly shown in Fig. 2, the length of the connecting rod being so proportioned that the elevation of the free rear end of the gate 21, will draw the detent spring 19 toward the rocking gate mentioned, and so effect the release of the platform 12.

A sliding gate 23, is provided to close the aperture in the front wall 11 of the case, which the guarded passage having the walls 18 is rearwardly opposite. The gate 23, is pivotally sustained on one end of the tilting lever 24, the latter being pivoted on the front wall of the trap case within the latter, said point of pivotal support 24ª being near the end of the tilting lever which is farthest removed from the gate 23.

A link rod 25, extends from the end of the shorter arm of the lever 24, downwardly to be loosely connected to one of the platform arms 12ª, and having such a relative length that it will allow the sliding gate 23, to descend by its gravity and the added weight of the longer portion of the lever 24, when the platform 12 is adjusted as shown by dotted lines in Fig. 1, a depression of said platform sufficiently causing the connecting link rod 25 to draw on the shorter arm of the tilting lever 24, so as to elevate the gate 23.

The operation is as follows: There being a proper kind and quantity of bait secured in the box 20, and the trap set level at a point where mice are likely to enter it, the entrance of a mouse below the hood, that is normally elevated so as to leave a free space around three sides of the platform, will not affect the platform until the mouse has become emboldened by its apparent safety, and takes a firm hold on the bait in the box 20. When the box is rocked by the rodent pulling or pushing the bait in it, the detent spring 19 will be released from the platform, thus permitting the latter to rock down and lift the sliding gate 23. At the same time the hood 13 and its wing walls 16, are drawn down so as to close the trap, by the weight of the mouse on the platform 12. As soon as the bait is released by the encaged animal, the detent spring 19 will hook onto the rear edge of the platform 12, and prevent its complete elevation, or the release of the hood and wings that are connected with it. As the sliding gate 23, had been lifted when the platform was depressed, the alarmed mouse will seek to escape through the aperture in the front wall of the cage before mentioned, and when the animal by its efforts to traverse the guard passage in which the skeleton gate 21 lies inclined, lifts said gate, the detent spring 19 will be drawn away from the engaged edge of the platform 12, the platform then moving upwardly as well as the hood and wings of the latter, by reason of the gravity of the weights 15. The sliding gate 23 is downwardly vibrated when the arms 12ª of the platform 12 move upwardly, so that the operation which has been described results in caging the live mouse and resetting the trap portion of the device. After the mouse has been drowned by an immersion of the trap and its cage in a pail of water, it may be removed through the sealed aperture in the rear wall of the cage if the pivoted door 11ᶜ is opened, and as before explained the cage may be mainly detached from the bottom piece 10, to permit it to be cleaned for further use.

Having thus described my invention, I claim as new and desire to secure by Letters Patent—

1. An animal trap, comprising a cage, a vibratile gate for an opening in the front wall of said cage, and a trap comprising a weight-lifted hood, and a vertically movable platform connected to the vibratile gate and hood, and depressed by the weight of the animal, substantially as described.

2. An animal trap, comprising a cage apertured in its front wall, a sliding gate to cover said aperture, a platform, a bottom piece for the cage extending below the platform, arms for the platform pivoted at their ends on the bottom piece, a weight-lifted hood having a loose connection with the platform, adapting the hood and platform to move together, and a skeleton gate pivoted in a guard passage behind the sliding gate and arranged to close said sliding gate when lifted, substantially as described.

3. In an animal trap, the combination, with a bottom piece flanged upwardly at its edge, a cage on a part of said bottom piece, and a platform supported to rock on the bottom piece over the front portion of said bottom piece, of a weight-supported and normally elevated hood having wing walls, which hood and wings are lowered when the platform is depressed, substantially as described.

4. In an animal trap substantially as described, the weight-supported rocking hood, composed of a top plate flanged at its edges, and two pivoted side wings that move on front pivots when the top plate is moved, substantially as described.

5. In an animal trap substantially as described, the bottom piece, the over-weighted pivoted hood, the rocking platform loosely connected to the hood and located over the bottom piece and below the hood, the cage adapted to receive the animal when it leaves the platform, and mechanism adapted to elevate the hood and platform when the cage is entered by the animal, substantially as described.

HENRY OBERMEYER.

Witnesses:
 HERMANN STUTHEIT,
 FERD. BOKENKRGER.